United States Patent [19]
Yamaguchi et al.

[11] Patent Number: 5,732,097
[45] Date of Patent: Mar. 24, 1998

[54] MODULATING CIRCUIT FOR SEMICONDUCTOR OPTICAL MODULATOR

[75] Inventors: Masayuki Yamaguchi; Nobutaka Watanabe, both of Tokyo, Japan

[73] Assignee: NEC Corporation, Tokyo, Japan

[21] Appl. No.: 680,155

[22] Filed: Jul. 15, 1996

[30] Foreign Application Priority Data

Jul. 14, 1995 [JP] Japan .................................. 7-201691

[51] Int. Cl.$^6$ ....................................................... H01S 3/10
[52] U.S. Cl. ................... 372/38; 372/26; 372/29
[58] Field of Search .................. 372/38, 26, 29

[56] References Cited

U.S. PATENT DOCUMENTS

| | | | |
|---|---|---|---|
| 4,577,320 | 3/1986 | Yoshikawa et al. | 372/29 |
| 5,018,154 | 5/1991 | Ohashi | 372/29 |

FOREIGN PATENT DOCUMENTS

| | | |
|---|---|---|
| 0632550 | 1/1995 | European Pat. Off. |
| 0673093 | 9/1995 | European Pat. Off. |

OTHER PUBLICATIONS

Journal of Lightwave Technology, vol. 6, No. 6, 1 Jun. 1988, pp. 779–785, XP000112480 Suzuki M et al: "Electrical and Optical Interactions Between Integrated INGAASP/INP DFB Lasers and Electroabsorption Modulators" Chapter IV-C pp. 782–783; figures 8, 9.

IEEE Photonics Technology Letters, vol. 4, No. 7, 1 Jul. 1992, pp. 720–723, XP000289295, Devaux F et al: "INGAASP/INGAASP Multiple–Quantum–Well Modulator with Improved Saturation Intensity and Bandwidth Over 20 GHZ" the whole document.

Applied Physics Letters, vol. 57, No. 11, Sep. 10, 1990, USA, pp. 1081–1083, XP002015363 Wood T.H. et al: "Electric field screening by photogenerated holes in multiple quantum wells: A new mechanism for absorption saturation", p. 1081, left–hand column, last paragraph—right—hand column, last paragraph; figures 1, 2.

"Low chirp transmission at 5.0Gbit/s using an integrated DBR laser–modulator transmitter", Electronics Letters, vol. 30, No. 16 4th Aug. 1994, pp. 1330–1331.

"Transmission beyond the dispersion limit using a negative chirp electroabsorption modulator," Electronics Letters, vol. 30 No. 14, 7th Jul. 1994, pp. 1168–1169.

*Primary Examiner*—James W. Davie

[57] ABSTRACT

A modulating circuit for a semiconductor optical modulator is composed of a driver 3 DC-coupled to an optical modulator 2, a load resistor 4 connected in parallel to the modulator 2, and a constant current source 5 connected in parallel to the optical modulator 2 for drawing out the photo-current generated in the optical modulator 2 by absorption of light emitted from a semiconductor laser. The modulating circuit can perform light intensity modulation with low wavelength chirping using a driver DC-coupled to the optical modulator 2. The drawing out current is approximately equal to or more than an average of photo-current which is generated in the optical modulator 2 by light absorption at the time of modulation.

17 Claims, 7 Drawing Sheets

CURRENT = 0

FIG.5A

CURRENT = 15mA

MODULATING CIRCUIT FOR SEMICONDUCTOR OPTICAL MODULATOR

BACKGROUND OF THE INVENTION

1. Field of the Invention

The present invention relates to a modulating circuit of a semiconductor optical modulator, and more particularly, to a modulating circuit which can modulate an optical signal while maintaining a low chirp operation of an electroabsorption-type optical modulator.

2. Description of Related Art

Multimedia times comes on and as transmission of image information having a large data capacity increases, a trunk line communication network is required to transmit the image information in the order of Gb/s. In an optical fiber communication system which is used for the network of the trunk line system, the system of 2.4 Gb/s is coming to a practical use at present.

In such a high speed optical fiber communication system, if there is fluctuation of wavelength, i.e., wavelength chirping when a light signal from a light source is modulated, the waveform of the light signal after the transmission has been distorted due to influence of wavelength dispersion in the optical fiber. As the light source having low wavelength chirping at the time of modulation, the combination structure of a semiconductor laser and an optical modulator is considered and studied to come to practical use. According to the combination structure, because the semiconductor laser is operated to emit light having a stable single wavelength and the light is modulated at the outside of the semiconductor laser, the wavelength chirping at the time of modulation becomes small. In this case, a single body of semiconductor laser and a single body of optical modulator may be connected to each other or a device in which the semiconductor laser and the optical modulator are integrated may be used.

Figures 1A, 1B:
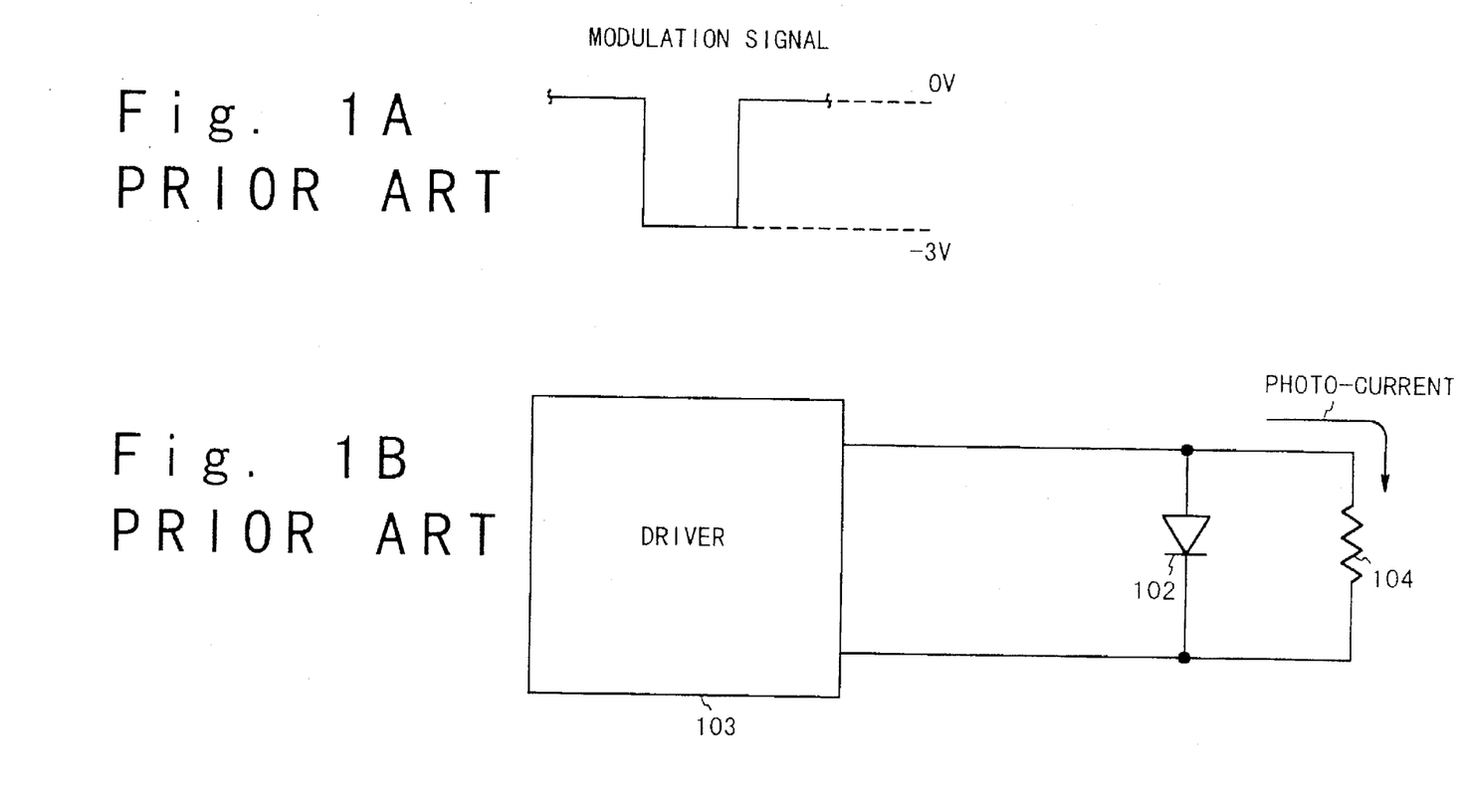
FIG. 1A is a diagram illustrating a modulation signal used a conventional modulating circuit.
FIG. 1B is a block diagram illustrating the structure of the conventional modulating circuit.

FIG. 1A is a diagram illustrating a waveform of a modulation signal used in a conventional modulating circuit. FIG. 1B is a diagram illustrating the structure of the conventional modulating circuit, in which a semiconductor laser is omitted. The light from the light source which is used for optical fiber communication is generally modulated into an optical digital signal. In case of the electroabsorption-type optical modulator in which the shift of the absorption edge to the longer wavelength side when electric field is applied is used, the light is generally modulated in accordance with a modulation signal between 0 V and a negative voltage, e.g., –3 V as shown in FIG. 1A.

In a case where "1" or "0" continues for a long time in the digital signal, in order to realize the accurate optical modulation without change of the operation voltage, the optical modulator 102 and the driver 103 for driving the optical modulator 102 are DC-coupled to each other, as shown in FIG. 1B. The driver 102 is generally composed of an emitter coupled logic (ECL) circuit with an opened emitter or opened drain. The output impedance of the driver 103 is large at the operation. The large output impedance causes a problem for the following reason. That is, photo-current is generated in the optical modulator 102 by absorption of light emitted by the semiconductor laser. If the output impedance of the driver 103 is large, the photo-current flows into the load resistor 104 which generally has 50 Ω. Accordingly, the offset is added to the operation point of the optical modulator 102 in a forward direction (the positive direction) with respect to the P-N junction of the optical modulator 102 by a value equal to the product of the photo-current and the load resistor value (this phenomenon is referred to as "self-bias phenomenon in a forward direction" hereinafter).

For instance, if the photo-current of 15 mA is generated as an average value during the modulation, the product of the photo-current and the load resistor value is 0.75 V. In a case where the modulation signal has an amplitude of 3 Vp-p, the optical modulator 102 is self-biased in the forward direction by +0.75 V. As a result of this, the modulation is performed between +0.75 V and –2.25 V.

In an electroabsorption-type optical modulator, the change of refractive index becomes great during the modulation because the photo-carriers which are generated by the light absorption are accumulated in an absorption layer when the operation voltage takes a value in a positive value range. As a result, great optical phase modulation is caused so that the fluctuation of wavelength becomes great. For this reason, the waveform of the optical signal after transmission is degraded. This is found through experiment by the inventors.

SUMMARY OF THE INVENTION

Therefore, the present invention has, as an object, to provide a modulating circuit for modulating a semiconductor modulator wherein the modulating circuit can perform light intensity modulation with low wavelength chirping even in a case of using a driver DC-coupled to the optical modulator.

Another object of the present invention is a method of modulating a light from a semiconductor laser with low wavelength chirping.

In order to achieve an aspect of the present invention, a modulating circuit including a semiconductor laser, includes an electroabsorption-type semiconductor optical modulator for optical modulation of light from the semiconductor laser, a driver DC-coupled to the optical modulator, for driving the optical modulator in accordance with a modulation signal, a load resistor connected in parallel to the optical modulator, and a cancelling section for cancelling self-bias of the optical modulator due to photo-current which is generated by absorption of the light from the semiconductor laser in the optical modulator.

The cancelling section may be a constant current source connected in parallel to the load resistor to cancel the photo-current generated in the optical modulator by supplying a predetermined current. The constant current source preferably supplies the current having a magnitude approximately equal to or greater than an average of the photo-current generated in the optical modulator during the modulation. A choke coil may be disposed between the load resistor and the cancelling section. In this case, the choke coil has an inductance such that the choke coil has an impedance greater than the load resistor in a frequency range other than an operation frequency range of a transistor of the constant current source.

Alternatively, the cancelling section provides an offset voltage to the modulation signal in a negative voltage direction. It is preferable that the offset voltage is approximately equal to or greater than a product of an average of the photo-current generated in the optical modulator during the modulation and a resistance of the load resistor. In this case, the forward direction self-bias phenomenon is cancelled by the offset voltage.

In order to achieve another aspect of the present invention, a method of performing modulation with low wavelength chirping in a modulating circuit including a semiconductor laser, includes the steps of:

generating a modulation signal;

driving an electroabsorption-type semiconductor optical modulator in accordance with the modulation signal; and cancelling self-bias of the optical modulator due to photo-current which is generated by absorption of the light from the semiconductor laser in the optical modulator.

DESCRIPTION OF THE PREFERRED EMBODIMENTS

The modulating circuit for a semiconductor optical modulator of the present invention will be described below in detail with reference to the accompanying drawings.

Figure 2:
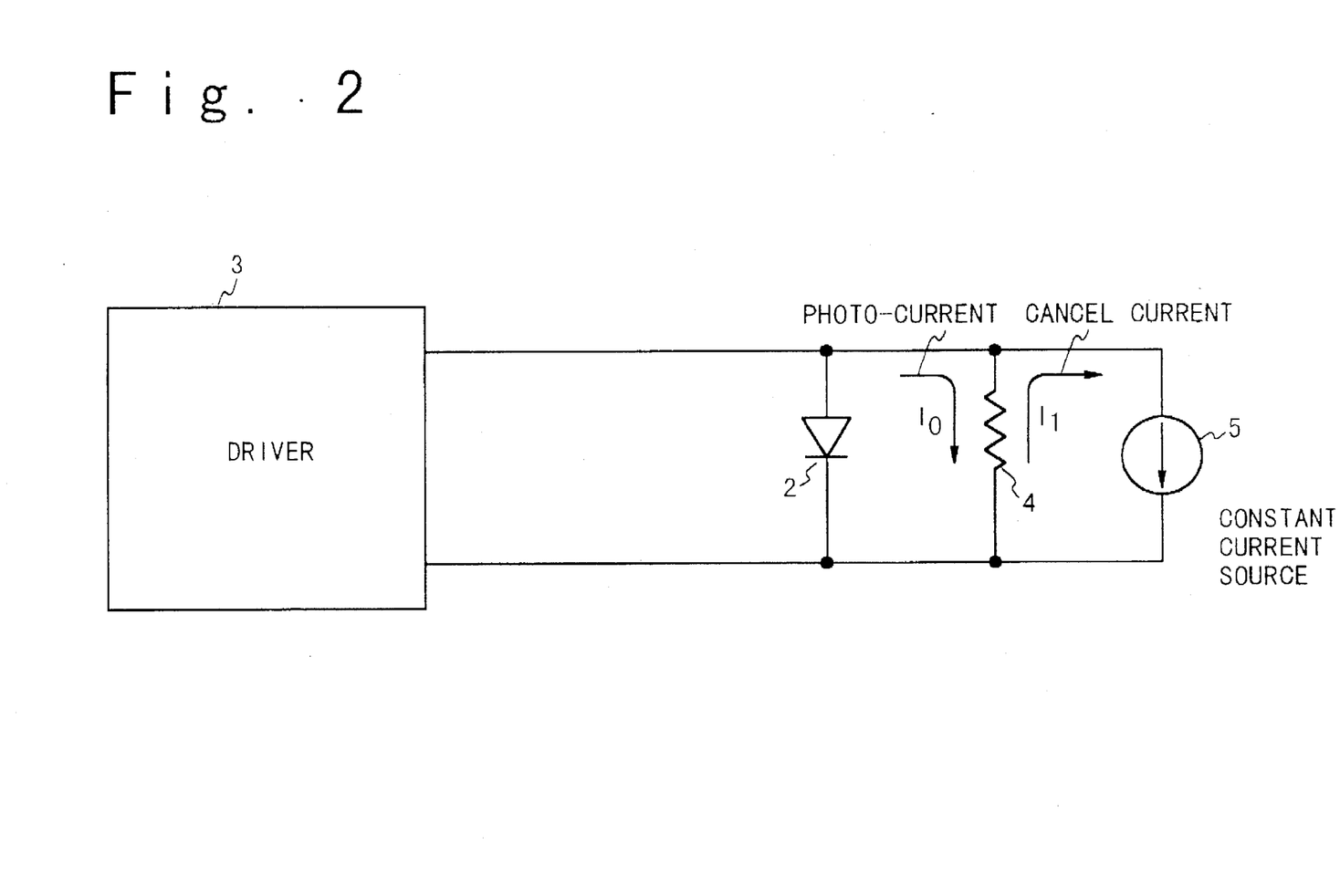
FIG. 2 is a diagram for explaining the principle of the modulating circuit for the optical modulator of the present invention.

FIG. 2 shows the principle of the present invention. The present invention provides the modulating circuit which can suppress the self-bias phenomenon in a forward direction caused when the electroabsorption-type optical modulator is modulated by the driver DC-coupling to the optical modulator. Referring to FIG. 2, because an optical modulator 2 is self-biased by photo-current I0 flowing through a load resistor 4, it is required to connect a current by-pass circuit 5 (or a current drawing out circuit or a current cancelling circuit) in parallel to the load resistor 4 such that the photo-current I0 does not flow through the load resistor 4 in order to suppress the self-bias phenomenon. In this case, the input impedance of the current drawing out circuit 5 must be set to a sufficiently large value compared to the load resistor 4 to maintain the impedance matching to a driver 3. Such a current drawing-out circuit can be realized by connecting the constant current source 5 to the load resistor 4 in parallel, as shown in FIG. 2.

That is, the constant current source 5 is connected such that the current I1 from the constant current source 5 flows in a direction in which the P-N junction of the optical modulator 2 is reversely biased, in the other words, the current I1 flows through the load resistor 4 in a direction reverse to that of the photo-current I0. The magnitude of the current I1 is equal to or greater than the amount of photo-current I0. Thereby, the photo-current I0 flowing through the load resistor 4 is cancelled by the current I1 from the constant current source 5 so that the self-bias phenomenon is suppressed.

It should be noted that even if the current I1 more than the photo-current I0 is flowed by the constant current source 5, there is no problem in that the wavelength chirping specifically becomes great, because the optical modulator 2 is not biased in a forward direction.

The input impedance of the constant current source 5 is very large. However, the input impedance sometimes becomes small to a high frequency range. In the case, in order to maintain the high impedance in the high frequency range, an impedance compensating circuit or a choke coil is preferably added in series with the constant current source 5.

There are cases where a unit for generating a modulation signal which has an offset on the negative voltage side is used as the driver. In this case, however, the self bias of the modulator can be cancelled if the offset voltage is set to a value equal to or larger than the product of the photo-current and the load resistor value. As a result, like the case that the photo-current drawing out technique by the constant current source is used, the good light intensity modulation can be performed with small wavelength chirping.

Next, the modulating circuit according to the first embodiment of the present invention will be described in detail with reference to FIGS. 3A and 3B.

Figure 3A:
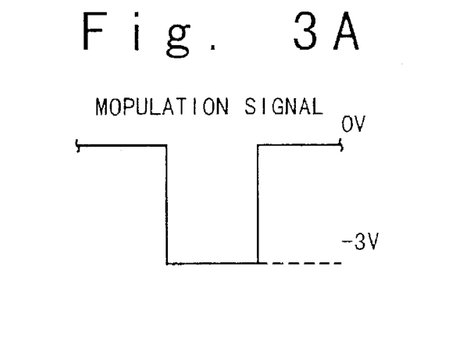
FIG. 3A is a diagram illustrating a modulation signal used a modulating circuit according to a first embodiment of the present invention.
Figure 3B:
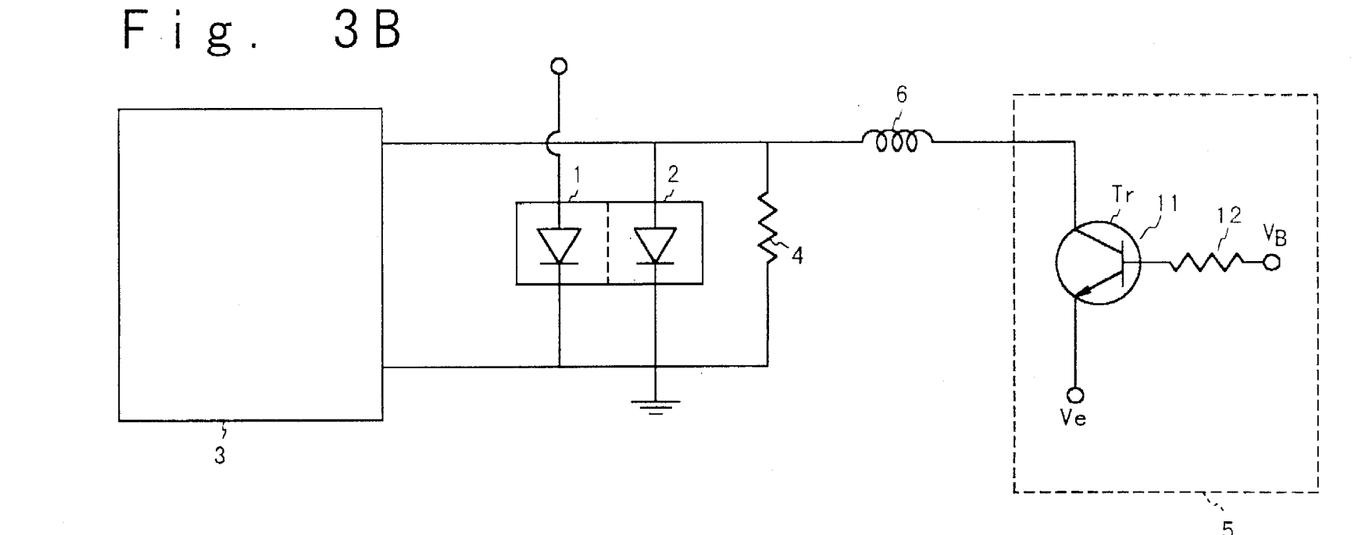
FIG. 3B is a diagram showing the structure of the modulating circuit for the optical modulator according to the first embodiment of the present invention.

FIG. 3B is a diagram illustrating the structure of a modulating circuit of a semiconductor optical modulator according to the first embodiment of the present invention. Referring to FIG. 2, the modulating circuit is composed of a distributed feedback (DFB) type semiconductor laser 1, an optical modulator 2, a driver 3 DC-coupled to the optical modulator 2, a load resistor 4 connected in parallel to the optical modulator 2, and a constant current source 5. In this embodiment, the semiconductor laser 1 and the optical modulator 2 are integrated into as a unitary body. However, they may be separately provided as single bodies, respectively. A choke coil 6 may be connected between the constant current source 5 and the optical modulator 2. The constant current source 5 can be composed of a simple circuit which uses a transistor 11, as shown in FIGS. 3B. That is, of an NPN transistor 11, a collector is connected to one terminal of the load resistor 4 and an emitter is connected to a bias boltage of Ve. A base is connected to a bias voltage of $V_B$ via a biasing resistor 12. The drawing-out current is controlled by this bias of $V_B$. The input impedance of the constant current source 5 is very large within the operation frequency range of the transistor 11. In this embodiment, the transistor 11 having bandwidth of 400 MHz is used. The inductance of the choke coil 6 is set to 1 μH to have the sufficiently large impedance to the frequency range of equal to or more than 400 MHz other than the operation frequency range of the transistor 11.

The optical modulation was actually performed using the structure of FIG. 3B and a modulation signal having a waveform shown in FIG. 3A. The transmission of 120 km was performed with 2.5 Gb/s using a standard optical fiber. The result will be described below. Current of 100 mA was injected into the semiconductor laser 1 such that average light of 4 mW is outputted from the optical modulator 2 during the modulation. The modulation signal of 3 Vp-p as shown in FIG. 3A was applied to the optical modulator 2. The photo-current generated by the optical modulator 2 at that time was 15 mA. Note that the average photo-current I0 may be defined as I0=(Im+Is)/2, where Im is the photo-current at an applied voltage of mark level (0 V in this case) and Is is the photo-current at an applied voltage of space level (−3 V in this case), which are measured in DC condition.

Figure 4:
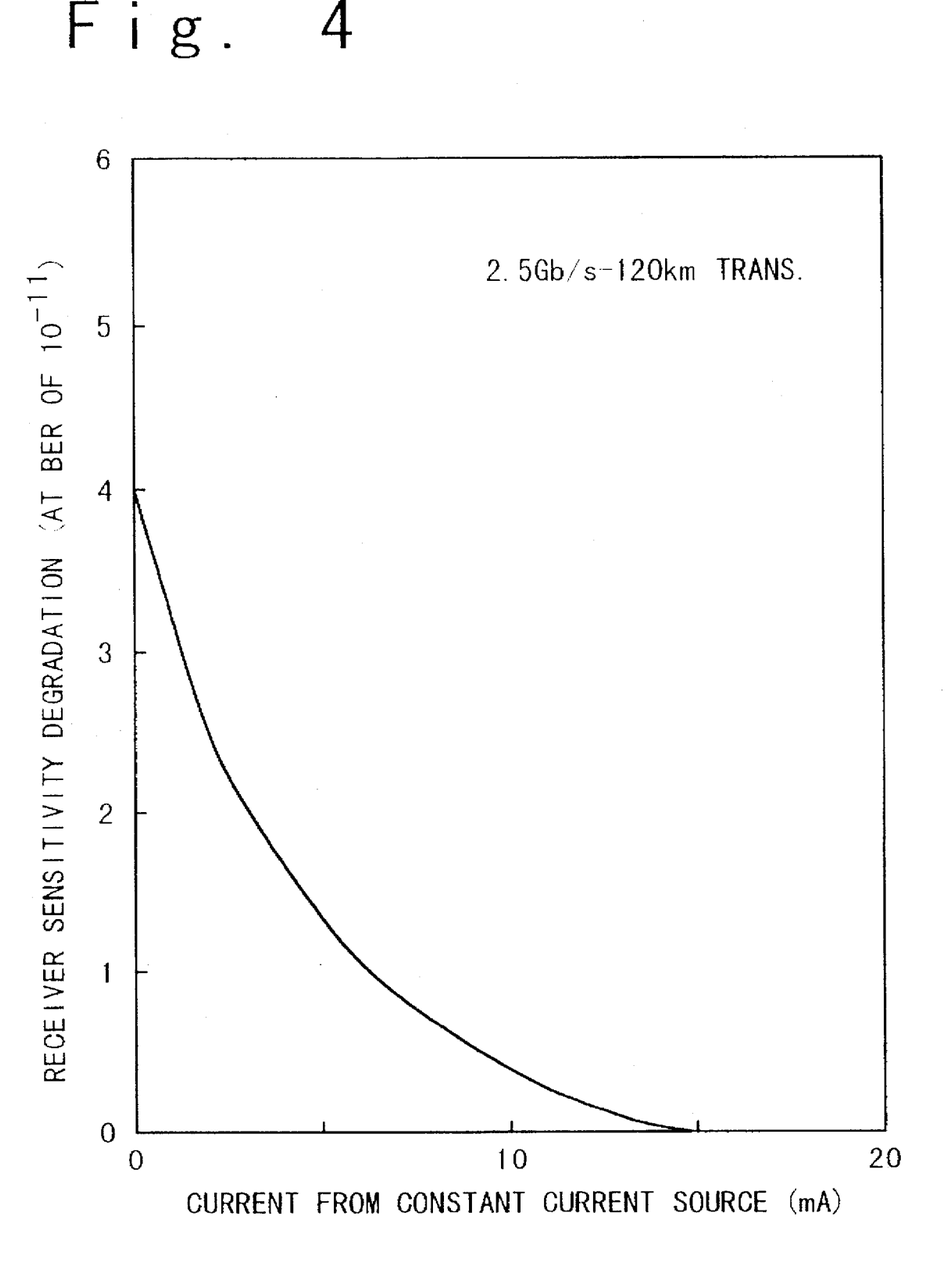
FIG. 4 is a graph showing the dependency of receiver sensitivity degradation upon current of a constant current source when transmission of 120 km is performed at the bit rate of 2.5 Gb/s using the modulating circuit according to the first embodiment of the present invention.

FIG. 4 is a graph indicating dependency of degradation amount of receiver sensitivity of the optical signal measured after the transmission of 120 Km in comparison with the receiver sensitivity before the transmission upon current flowing out from the constant current source 5. The abscissa represents the degradation amount of receiver sensitivity (decibel notation) at the bit error rate (BER) of $10^{-11}$ and the ordinate indicates the current value of the constant current source. If there is wavelength chirping at the time of modulation, it appears as the degradation of receiver sensitivity after the transmission. However, as a result of the experiment, the degradation of receiver sensitivity could not be found when the current from the current source is equal to or larger than 15 mA. That is, the degradation amount of receiver sensitivity is 0 dB when the current value of the constant current source 5 is equal to or more than the photo-current. In this manner, the wavelength chirping could be effectively suppressed.

Figure 5A:
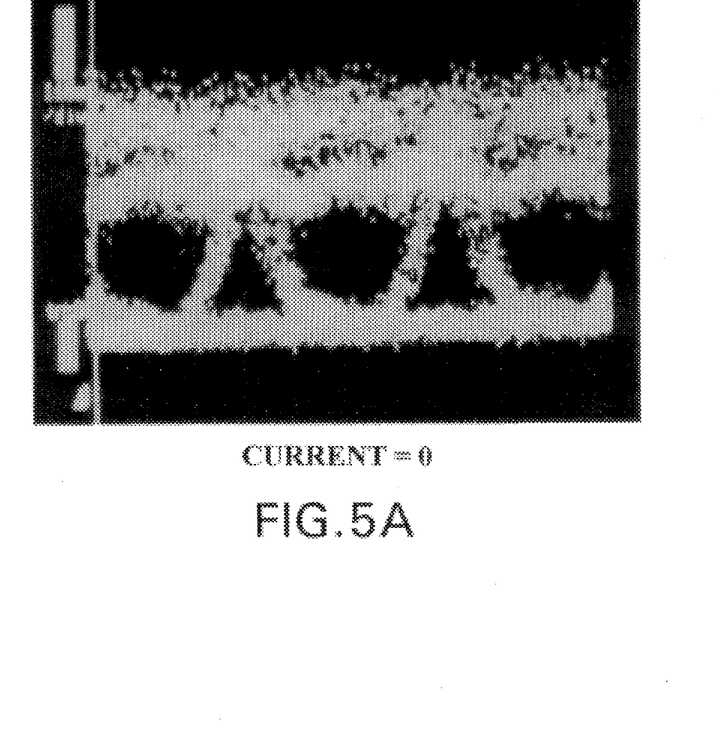
FIGS. 5A and 5B are diagrams showing the light waveforms after the transmission of 120 km at the bit rate of 2.5 Gb/s using the modulating circuit according to the first embodiment of the present invention when a current value=0 and a current value=15 mA.
Figure 5B:
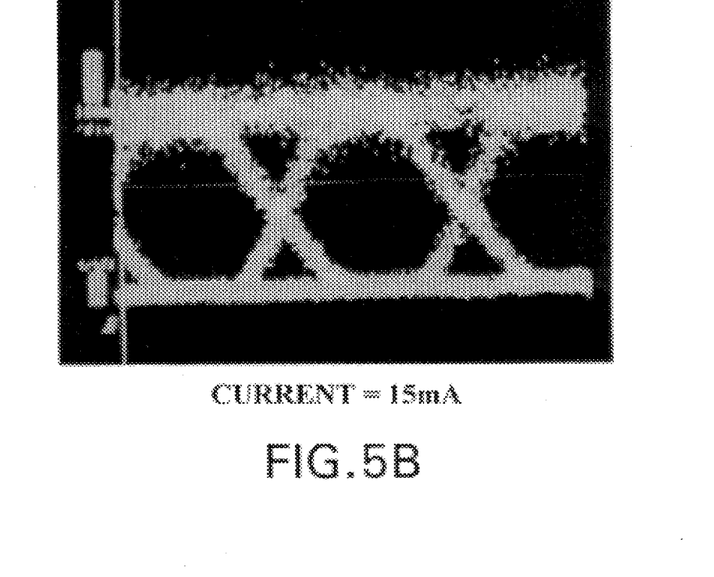

FIGS. 5A and 5B show the waveforms of optically modulated signal after the transmission of 120 Km when the current of the constant current source is 0 and 15 mA. As seen from the figures, since the wavelength chirping is suppressed by flowing the current from the constant current source 5, the waveform of the optical pulse signal after the transmission is greatly improved such that a good eye pattern can be obtained. In this way, it was ensured that the drawing out of current by the constant current source is extremely effective to suppress the wavelength chirping.

The modulating circuit of the optical modulator according to the first embodiment of the present invention has a point analogous to the circuit which is used when the semiconductor laser is directly modulated (in that a driver, a semiconductor laser and a constant current source are connected to have the analogous arrangement). However, in a case of direct modulation semiconductor laser, the direction of connection of the constant current source is opposite to that of this embodiment (i.e. current is flowed in a forward direction of the P-N junction). Also, the constant current source is for directly injecting current into the semiconductor laser. On the other hand, in the present embodiment, the current is not injected into the optical modulator 2 but used to cancel the photo-current flowing through the load resistor 4. As described above, the circuit structure and circuit operation of the present invention is quite different from the case of semiconductor laser direct modulation. Also, there has been no idea, so far, that the current source is connected to the modulator because the modulator operates by applying electric field. The present invention is remarkably new in the meaning.

Figure 6A:
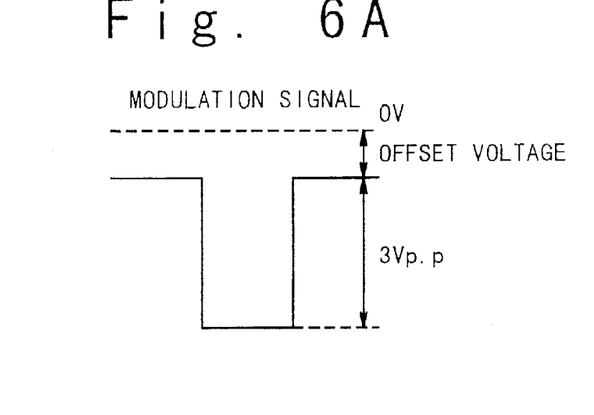
FIG. 6A is a diagram illustrating a modulation signal used a modulating circuit according to a second embodiment of the present invention.
Figure 6B:
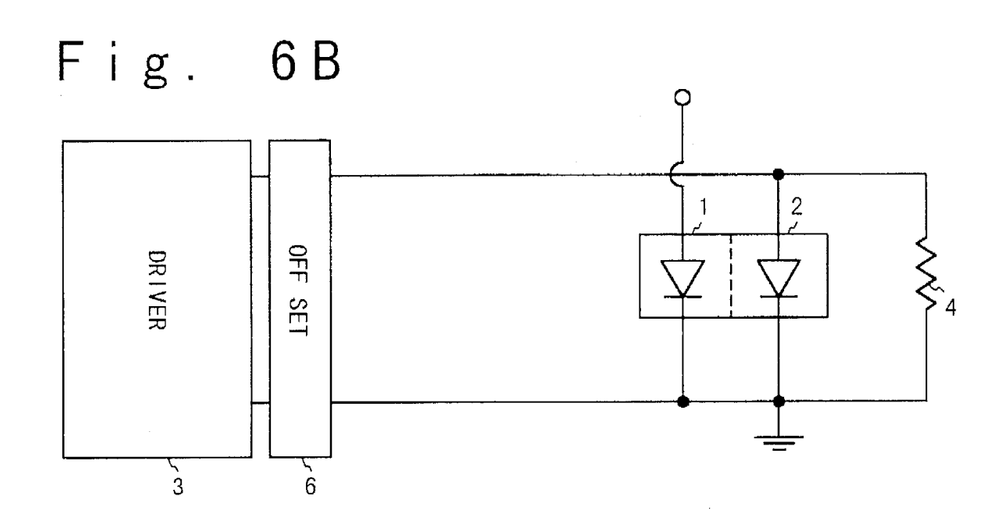
FIG. 6B is a block diagram illustrating the structure of a modulating circuit according to the second embodiment of the present invention.

Next, the modulating circuit of the semiconductor optical modulator according to the second embodiment of the present invention will be described. FIG. 6B is a diagram illustrating the structure of the modulating circuit of the semiconductor optical modulator according to the second embodiment of the present invention. Referring to FIG. 6B, the modulating circuit is composed of the driver 3 for outputting a modulation signal, an offset circuit 6 for adding an offset voltage to the modulation signal on the negative voltage side, as shown in FIG. 6A, the optical modulator 2 DC-coupled to the offset circuit 6 and the load resistor 4 of 50 Ω. The optical modulator 2 is integrated with the DFB laser 1. The current injected to the semiconductor laser 1, the modulation amplitude, and the photo-current generated in the optical modulator 2 are the same as the first embodiment (100 mA, 3 Vp-p, and 15 mA, respectively). The transmission experiment of 120 Km was actually performed with bit rate of 2.5 Gb/s using the structure of FIG. 6B.

Figure 7:
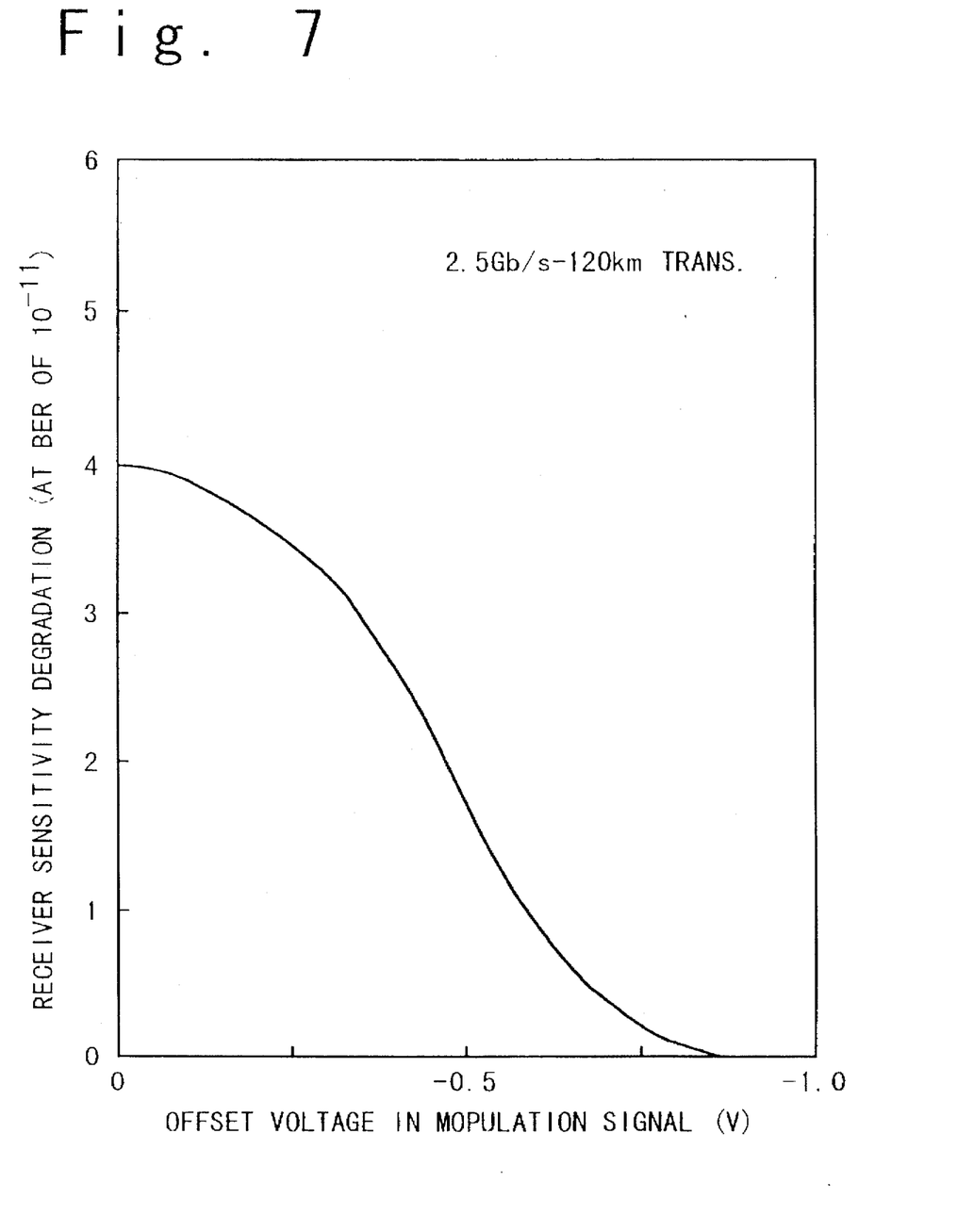
FIG. 7 is a graph showing the dependency of receiver sensitivity degradation upon offset voltage of the modulation signal when transmission of 120 km is performed at the bit rate of 2.5 Gb/s using the modulating circuit according to the second embodiment of the present invention.

FIG. 7 shows a graph indicating the dependency of receiver sensitivity degradation after the transmission upon the offset voltage of the modulation signal. In the figure, the abscissa represents the amount of receiver sensitivity degradation (the decibel notation) at the bit error rate (BER) of $10^{-11}$ and the ordinate represents the offset voltage of modulation signal (V). Referring to FIG. 7, in a case where the offset voltage of the offset modulation signal is set to a voltage to equal to or more than 0.75 V in the direction of negative voltage, the transmission characteristic having no receiver sensitivity degradation could be obserbed. This is because the self-bias in a forward direction in the optical modulator 2 caused by the photo-current flowing through the load resistor 4 is cancelled by the negative offset voltage, resulting in the wavelength chirping suppressed at the time of modulation. Preferably, the offset voltage is set to a value equal to or more than the product of the average photo-current at the time of modulation and the load resistor value.

As described above, in the first embodiment of the present invention, the drawing out current value by the constant current source is set to a value equal to or more than the photo-current. Also, in the second embodiment, the offset voltage of the modulation signal is set to a value equal to or more than the product of the photo-current and the load resistor. However, these values are determined from the viewpoint to suppress the wavelength chirping, i.e., to the output correctly corresponding to the modulation signal. If it is desirable that the light of a high level as much as possible is outputted from the optical modulator 2 even if there is wavelength chirping, the smaller one is better within the permission range of the drawing out current or offset voltage. That is, it is preferable that the drawing out current is substantially equal to the photo-current in case of the first embodiment and the product of the photo-current and the load resistor value in case of the second embodiment.

In the above embodiments, the modulator integrated with the semiconductor laser is used. However, even if the modulator is separated from the laser and is a single body, the present invention is effective. Further, the modulation bit rate is not limited to 2.5 Gb/s and the present invention is effective to the modulation of 10 Gb/s.

If the optical fiber transmission is performed not using the modulation technique according to the present invention, the maximum data transmission distance is about 60 Km at the transmission rate of 2.5 Gb/s. However, as described above, by applying the modulation technique of the present invention, the data transmission is made possible over 300 Km.

What is claimed is:

1. A modulating circuit including a semiconductor laser, comprising:

an electroabsorption-type semiconductor optical modulator for optical modulation of light from said semiconductor laser;

a driver DC-coupled to said optical modulator, for driving said optical modulator in accordance with a modulation signal;

a load resistor connected in parallel to said optical modulator; and cancelling means for cancelling self-bias of said optical modulator due to photo-current which is generated by absorption of the light from said semiconductor laser in said optical modulator.

2. A modulating circuit according to claim 1, wherein said cancelling means is a constant current source connected in parallel to said load resistor to cancel the photo-current generated in said optical modulator by supplying a predetermined current.

3. A modulating circuit according to claim 2, wherein said constant current source supplies the current having a magnitude approximately equal to or greater than an average of the photo-current generated in said optical modulator during the modulation.

4. A modulating circuit according to claim 2, wherein said constant current source includes a resistor connected to a bias at one terminal, and a transistor having a collector and emitter connected to said load resistor and a base connected to said resistor at the other terminal.

5. A modulating circuit according to claim 1, further includes a choke coil disposed between said load resistor and said cancelling means.

6. A modulating circuit according to claim 3, further includes a choke coil disposed between said load resistor and said cancelling means.

7. A modulating circuit according to claim 6, wherein said choke coil has an inductance such that said choke coil has an impedance greater than said load resistor in a frequency range other than an operation frequency range of said transistor.

8. A modulating circuit according to claim 1, wherein said cancelling means sets an offset voltage in the modulation signal in a negative voltage direction.

9. A modulating circuit according to claim 8, wherein said offset voltage is approximately equal to or greater than a product of an average of the photo-current generated in said optical modulator during the modulation and a resistance of said load resistor.

10. A modulating circuit according to claim 1, wherein said semiconductor laser and said optical modulator are integrated as a unitary device.

11. A modulating circuit according to claim 1, wherein said semiconductor laser and said optical modulator are separately provided as single bodies, respectively.

12. A method of performing modulation with low wavelength chirping in a modulating circuit including a semiconductor laser, comprising the steps of:

generating a modulation signal;

driving an electroabsorption-type semiconductor optical modulator in accordance with the modulation signal; and cancelling self-bias of said optical modulator due to photo-current which is generated by absorption of the light from said semiconductor laser in said optical modulator.

13. A method according to claim 12, wherein said cancelling step includes supplying a predetermined current to a load resistor connected in parallel to said optical modulator to cancel the photo-current generated in said optical modulator.

14. A method according to claim 13, wherein said current is approximately equal to or greater than an average of the photo-current generated in said optical modulator during the modulation.

15. A method according to claim 13, wherein said current is supplied from a constant current source, and said cancelling step further includes providing an impedance greater than said load resistor in a frequency range in which an impedance of said constant current source is smaller than said load resistor.

16. A method according to claim 12, wherein said cancelling step includes adding an offset voltage in the modulation signal in a negative voltage direction.

17. A method according to claim 16, wherein said offset voltage is approximately equal to or greater than a product of an average of the photo-current generated in said optical modulator during the modulation and a resistance of a load resistor connected in parallel to said optical modulator.

* * * * *